United States Patent Office.

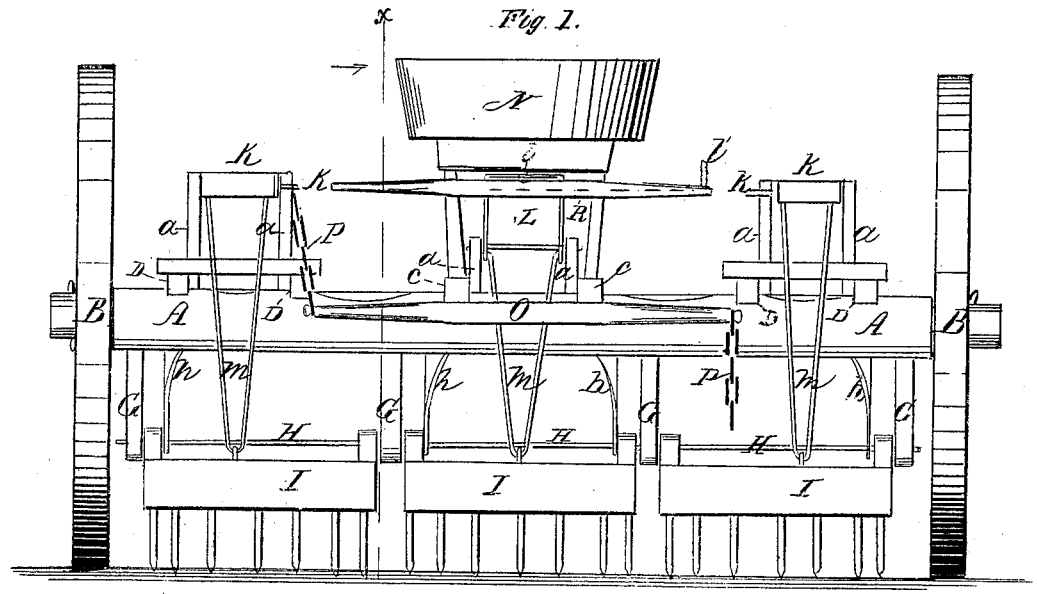
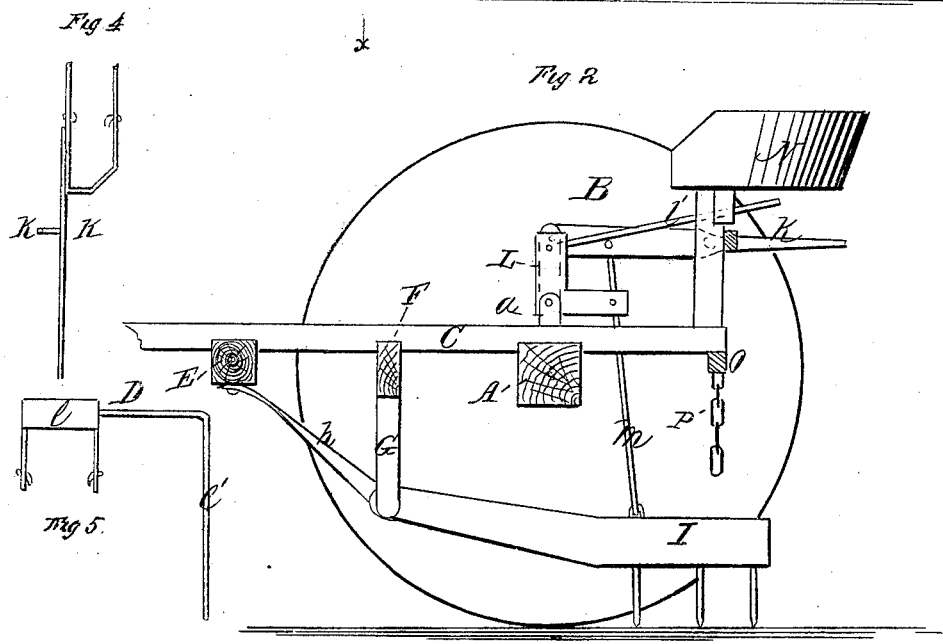
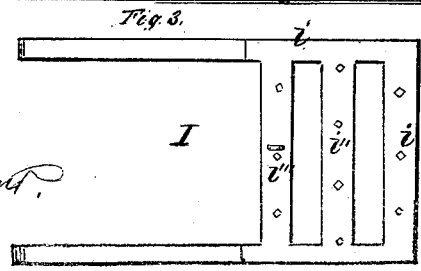

ISAAC LOW, OF EAST FAIRFIELD, OHIO.

Letters Patent No. 94,326, dated August 31, 1869.

IMPROVEMENT IN HARROWS.

The Schedule referred to in these Letters Patent and making part of the same.

*To all whom it may concern:*

Be it known that I, ISAAC LOW, of East Fairfield, in the county of Columbiana, and in the State of Ohio, have invented certain new and useful Improvements in Harrows; and do hereby declare that the following is a full, clear, and exact description thereof, reference being had to the accompanying drawing, making a part of this specification, in which—

Figure 1 is a rear elevation of my improved harrow;

Figure 2 is a vertical cross-section of the same, on the line x x of fig. 1;

Figure 3 is a plan view of one of the harrow-sections;

Figure 4 is a detached view of one of the levers for raising the side-sections; and Figure 5 is a like view of the lever for raising the centre-section.

Letters of like name and kind refer to like parts in each of the figures.

My invention relates to a class of harrows which are made in sections, for the purpose of enabling them to conform more readily to the irregularities of the ground; and It consists in the means employed for raising said sections from the ground, when desired, for the purpose of clearing the teeth from leaves, stalks, or other impediments.

It also consists in the application of rubber bands or chains to the side-section levers, for the purpose of adjusting the pressure of the sections upon the ground.

In the annexed drawing—

A represents an axle-tree, supported upon two wheels B B, and having secured to it the frame, consisting of the tongue C, divided at its rear end into two parts c c, strips D D, &c., and bars E and F.

G G, &c., represent four braces, secured vertically to the lower side of the cross-bar F, through the ends of which passes a rod, H, which furnishes an axial bearing for the front ends of the harrow-sections I I, &c.

Four strips of sheet-metal, h h, &c., are secured at their front ends to the cross-bar E, and pivoted at their rear ends upon the rod H, for the purpose of bracing and strengthening said rod and the braces G G, &c., so as to enable them to securely hold the harrow-sections.

The harrow-sections I I, &c., are each composed of two side-pieces i i, secured at their rear ends by a cross-bar, i'.

Two other cross-bars, i" and i'", are arranged in front of and parallel to the cross-bar i', and furnish, in connection therewith, a support for the harrow-teeth.

The side-pieces i incline upward from the front cross-bar i'", so as to bring their front ends on a line with the rod H, when their rear ends are resting horizontally upon the ground.

In order that the operator may be enabled to elevate the harrow-sections when desired, three levers, K, K, and L, constructed in the form shown in figs. 4 and 5, are pivoted within suitable uprights a a, &c., secured to and projecting upward from the axle.

The side-levers K K are bifurcated at their front ends, near which are pivoted the upper ends of the rods M M, which, being double, or in the form of a loop, are pivoted at their middle to the front cross-bar of the sections, by means of a staple passing over said rod and into said cross-bar.

The length of the rods is such, that when the sections are resting upon the ground, the levers extend horizontally to the rear, so as to be within convenient reach of the operator, whether walking behind or riding upon the seat N, and enables him to elevate or depress said sections with great ease.

The centre-section is, like the others, connected by means of a rod, M, with a lever, L, which lever is, however, constructed in a different manner from the others, as it extends to the rear only far enough to furnish a support for the rod M, the side-pieces being connected together at their front ends by means of a bridge or brace, l.

A rod, l', secured to said bridge, extends laterally to one side, so as to clear the seat, and from thence is carried to the rear, where it furnishes a means by which the operator can adjust the centre-section vertically while in the rear of the machine. When riding upon the seat, said operator can readily adjust said centre-section by placing his foot upon the bridge l of the lever.

It being sometimes desirable to increase the pressure upon the outer sections, a cross-bar, O, is secured to the frame beneath the seat, and extends laterally to, or in a line with the side-levers.

Attached to each end of said bar is one end of a rubber chain or band, P, the opposite end of which may be attached to a stud, k, projecting horizontally inward from each side-lever K, when, by increasing or diminishing the length of said chain or band, the downward pressure upon the levers, and consequently upon the outer sections, may be varied at will.

When not in use, the upper ends of the chains or bands may be looped over the ends of another cross-bar, R, secured to the support immediately beneath the seat.

This harrow possesses many advantages over any in use, as, by its construction and arrangement, the operator is enabled to elevate or depress either section at will, whether riding upon the seat or walking behind, and also to increase or diminish the downward pressure of the side-sections, as may be found necessary.

This, in connection with the simplicity of the several parts of the device, and the small cost at which it can be furnished, will, it is believed, render it the most desirable of any in use.

Having thus fully set forth the nature and merits of my invention,

What I claim as new, and desire to secure by Letters Patent, is—

The within-described harrow, consisting of the frame C, D D, E, and F, braces G G, &c., rod H, sections I I, levers K K and L, $l$ and $l'$, rods M, cross-bars O and R, and rubber band or chain P, all constructed and arranged to operate substantially as and for the purpose shown.

Also, the means employed for raising and lowering the harrow-sections, consisting of the levers K K and L, $l$ and $l'$, and rods M, substantially as and for the purpose shown.

Also, the employment of the rubber chain or bands P P, for increasing the pressure upon the harrow-sections, substantially as herein shown, and for the purpose specified.

In testimony that I claim the foregoing, I have hereunto set my hand, this 14th day of June, 1869.

ISAAC LOW.

Witnesses:
GEORGE HEVERLY,
THOS. C. ALLEN.